US008292058B2

(12) United States Patent
Grobbel

(10) Patent No.: US 8,292,058 B2
(45) Date of Patent: Oct. 23, 2012

(54) ESCALATOR

(75) Inventor: Burkhard Grobbel, Schmallenberg (DE)

(73) Assignee: Ketten-Wulf Betriebs-GmbH, Eslohe-Kueckelheim (DE)

(*) Notice: Subject to any disclaimer, the term of this patent is extended or adjusted under 35 U.S.C. 154(b) by 0 days.

(21) Appl. No.: 13/116,070

(22) Filed: May 26, 2011

(65) Prior Publication Data

US 2011/0220456 A1 Sep. 15, 2011

Related U.S. Application Data

(60) Division of application No. 12/376,018, filed on Apr. 22, 2009, which is a continuation of application No. PCT/EP2007/006676, filed on Jul. 27, 2007.

(30) Foreign Application Priority Data

Aug. 2, 2006 (DE) ......................... 10 2006 036 353
Jul. 23, 2007 (DE) ......................... 10 2007 034 628

(51) Int. Cl.
*B65G 21/00* (2006.01)

(52) U.S. Cl. ....................................... 198/330; 198/329

(58) Field of Classification Search .................. 198/321, 198/329, 330
See application file for complete search history.

(56) References Cited

U.S. PATENT DOCUMENTS 1,956,714 A 5/1934 Graf-Baker
3,419,127 A * 12/1968 Yost .............................. 198/329
RE27,439 E * 7/1972 Jackson et al. ................ 198/321
3,677,388 A 7/1972 Boltrek et al.
3,734,263 A * 5/1973 Dirks ............................ 198/324
4,082,173 A 4/1978 Simon-Kochloffel
4,498,890 A 2/1985 Sutherland
6,427,823 B1 8/2002 Ishikawa et al.
6,540,060 B1 4/2003 Fargo et al.
6,702,094 B2 3/2004 Ishikawa et al.
7,296,671 B2 11/2007 Pietz
7,568,571 B2 8/2009 Ogimura et al.
7,600,627 B2 10/2009 Ishikawa et al.
7,918,326 B2 * 4/2011 Illedits et al. ................. 198/330
2005/0016817 A1 * 1/2005 Pietz ............................ 198/330
2005/0061609 A1 3/2005 Pietz
2006/0011450 A1 * 1/2006 Fargo et al. ................... 198/330
2007/0235284 A1 10/2007 Ishikawa et al.

FOREIGN PATENT DOCUMENTS

DE 19849235 A1 4/2000
DE 10218374 A1 11/2003
EP 1344740 A1 9/2003
GB 2243430 A 10/1991
WO 03036129 A1 5/2003
WO 2005090221 A1 9/2005

* cited by examiner

*Primary Examiner* — Joseph A Dillon, Jr.
(74) *Attorney, Agent, or Firm* — Laurence A. Greenberg; Werner H. Stemer; Ralph E. Locher

(57) ABSTRACT

An escalator includes a plurality of steps or panels, a chain for driving the steps or panels, at least one chain wheel around which the chain is deflected and wherein the chain, starting from the chain wheel, forms an upper strand and a lower strand. There is also provided a device for the polygonal compensation of the movement of the at least one chain wheel. The effective lever arm of the chain on the at least one chain wheel in the upper strand is substantially equal to the effective lever arm of the chain on the at least one chain wheel in the lower strand.

20 Claims, 4 Drawing Sheets

ESCALATOR

CROSS-REFERENCE TO RELATED APPLICATION

This is a divisional application of application Ser. No. 12/376,018, filed Apr. 22, 2009; which was a continuation, under 35 U.S.C. §120, of International application PCT/EP2007/006676, filed Jul. 27, 2007; the application also claims the priority, under 35 U.S.C. §119, of German patent application Nos. DE 10 2006 036 353.1, filed Aug. 2, 2006 and DE 10 2007 034 628.1, filed Jul. 23, 2007; the prior applications are herewith incorporated by reference in their entirety.

BACKGROUND OF THE INVENTION

Field of the Invention

The present invention relates to an escalator with a plurality of steps or pallets; at least one chain for driving the steps or pallets; at least one chain wheel around which the chain is partially wrapped, wherein the chain forms an upper strand and a lower strand extending from the chain wheel; and means for polygonal compensation for the movement of the at least one chain wheel.

DEFINITIONS

The term escalator should comprise both escalators with steps, as they are used in department stores, for example, and moving sidewalks with pallets, as they are used in airports, for example.

FIG. 1 schematically shows a pintle chain G and a chain wheel R partially wrapped round the latter, to initially define a few terms. The pintle chain G comprises chain links K linked to each other via a pivot point P. The chain wheel K shown in an exemplary manner, has eight teeth Z, between which tooth spaces are arranged, into which pivot points P can engage. The angular pitch $\tau$ between two teeth or two tooth spaces is 45° in the example shown.

Furthermore, an entry angle $\phi$ is shown at the bottom side of the chain wheel in FIG. 1, which can arise, for example, due to a guide for deflecting pintle chain G. The entry angle $\phi$ is measured between the actual exit direction of the pintle chain G and the normal S on the line connecting detachment point A of the pintle chain G from the chain wheel R and the axis of rotation D of the chain wheel R. The entry angle $\phi$ is about 11° in the example shown.

A momentary angle of wrap $\nu$ is indicated in FIG. 1, which corresponds to the circumferential angle between two detachment points A of the pintle chain G from the chain wheel R, and is 180° in the case shown. When a chain link K detaches from the chain wheel R, the momentary angle of wrap u will be abruptly reduced, because with different entry angles $\phi$ at the top and bottom, a chain link K detaches at the top, for example, while at the same time the next chain link K has not contacted the bottom yet, however. This is why an average angle of wrap u will be assumed in the following, which is equal to or greater than the minimum angle of wrap and equal to or smaller than the maximum angle of wrap.

Furthermore, at the top of the chain wheel R, an effective lever arm $H_{eff}$ is indicated, which corresponds to the vertical distance between the effective line W of force, in particular tensile force of the pintle chain G and the rotary axis D of the chain wheel R. Like the momentary angle of wrap u, the effective lever arm $H_{eff}$ also varies during the movement of the pintle chain due to the detachment of the pintle chain one link at a time, in particular due to the polygonal contact of the chain on the chain wheel. At the bottom side of the chain wheel R, the effective lever arm $H_{eff}'$ is a bit shorter, while due to the slightly inclined effective line W of force of the pintle chain G, the effective lever arm $N_{eff}'$ does no longer extend through the detachment point A.

STATE OF THE ART

In escalators or moving sidewalks, their steps or pallets, are usually driven by drive chains, in particular on both sides, formed as so-called step chains or pallet chains, and are also attached to the latter. Usually the drive chains have 3 or 4 subdivisions, i.e. 3 or 4 links per step. The chain wheels used have about 16 to 25 teeth. This relatively high number is chosen to minimize the so-called polygonal effect.

The polygonal effect comes about by the variations in the effective lever arm $H_{eff}$ (see FIG. 1). Chain wheels are usually driven with constant angular velocity. Due to the variations in the effective lever arms, the velocity of the step chains also varies, the incessant acceleration and deceleration of the moved masses (chains, axles, steps) results in the generation of mass forces, which are transmitted as disturbing forces or torques into the step or pallet chains or into their drives, and lead to a shortened service life, or are a quantity which must be taken into account when designing the drive components, in particular. Moreover, the moving parts in an escalator combined with the surrounding steel structure, form a spring-mass system capable of vibration. In particular, the chains can be seen as springs, and steps, axles (if any), wheels, the people transported (on the steps or pallets) and again the chains, are to be seen as masses. This spring-mass system can have very unfavorable operating points depending on the parameters, as a function of the number of teeth of the chain wheels, the traversing velocity and the load.

In practice, this problem is usually solved by reducing the chain pitch and increasing the number of teeth. As the pitch is reduced and the number of teeth is increased, the polygonal effect is reduced, until a degree is reached, where the polygonal effect is so low in practice, i.e. the movement of the chains/steps/pallets is so uniform, that the polygonal effect causes practically no problem, but is still present.

Also, guides have been installed in the area of the chain wheels, which effect tangential entry of the chain onto the chain wheels. The primary aim of this measure is to reduce the entry noise of the chain on the chain wheels. Also, the polygonal effect is reduced hereby, but not compensated.

The conventional structure with relatively small chain pitch and a relatively high number of teeth of the chain wheels has substantial drawbacks, however.

First of all, the high cost of the chain for the steps or pallets is to be mentioned. The more subdivisions (the smaller the pitch) for the latter, the more links per step or per meter, and the higher its cost. Moreover, there is a higher number of positions per step/pallet, subject to wear. Over the period of operation of the escalator, adherence to the maximum admissible spacing between steps/pallets for as long as possible, is a very important criterion.

Due to the high number of teeth, the chain wheels have a relatively great diameter and need a large structural space, in particular for the drive station. This is how valuable space is lost in buildings. Due to great diameters, high driving moments are necessary, which entails higher cost for the drives.

An escalator of the initially mentioned type is known from European Patent Application EP 1 344 740 A1. The escalator described there has a chain wheel driven in a manner polygonally compensated by the upper strand, wherein a pintle chain partially wraps around the chain wheel. The chain wheel has an odd number of teeth. Due to the odd number of teeth, the lower strand does not run in a polygonally-compensated manner, but rather irregularly. Since the lower strand has also masses applied to it, such as the masses of chains, wheels, axles and steps or pallets, forces result from this irregularity, which are transmitted to the steps or pallets in the upper strand. Such an escalator may run comparatively smoothly in a heavily loaded state, due to the large quotient between the mass in the upper strand and the mass in the lower strand. In the unloaded state, or loaded with only few people, however, the upper strand will also run in a very uneven manner.

The problem on which the present invention is based, is the creation of an apparatus of the initially mentioned type, which runs comparatively smoothly even with a relatively low number of teeth on the at least one chain wheel.

BRIEF SUMMARY OF THE INVENTION

The effective lever arm of the chain at the at least one chain wheel in the upper strand is essentially equal to the effective lever arm of the chain at the at least one chain wheel in the lower strand. In the polygonal compensation configured for the upper strand, for example, this results not only in a constant velocity of the running of the upper strand, but also of the lower strand. The solution according to the present invention allows step or pallet chains with substantially increased pitch, such as chain pitch equal to half of the step pitch or a chain pitch equal to the step pitch, to be used and/or to reduce the structural space required.

I.1. The link chain drive which forms the basis of a first aspect of the invention comprises a drive chain sprocket for a link chain and comprises a drive system which can drive the drive chain sprocket with a non-uniform rotational speed for the purpose of compensating speed fluctuations of the link chain. Here and below, a "drive system" should be understood in a broad sense to mean any system which can output forces or torques to the drive chain sprocket. This encompasses in particular drive systems in the narrower sense, in which said forces or torques are actively generated, for example by means of an electric motor. Also encompassed, however, are "passive" drive systems in which said forces or torques are extracted from inertial systems such as for example a rotating flywheel mass. In a first embodiment, the link chain drive is characterized in that the drive system comprises the following elements:

- two wheels which are coupled by means of an endlessly encircling flexible traction mechanism, such that the rotation of one wheel can be transmitted to the other wheel via the traction mechanism; a movable tensioning element such as for example a tensioning roller which, by acting on the load-bearing strand of the traction mechanism, changes the effective length of the load-bearing strand; the load-bearing strand of the traction mechanism is by definition that portion of the flexible traction mechanism via which the force is transmitted from the driving wheel to the driven wheel. The stated change in length is preferably periodic and synchronous with the rotation of the drive chain sprocket from tooth to tooth.

I.2. The invention furthermore relates to a second embodiment of a link chain drive comprising a drive chain sprocket for a link chain and comprising a drive system (in the broad sense explained above) which can drive the drive chain sprocket with a non-uniform rotational speed for the purpose of compensating speed fluctuations of the link chain. Here, the drive system comprises two wheels which are coupled by means of an endlessly encircling flexible traction mechanism. According to a first variant, the link chain drive is characterized in that the axle of one of the two wheels is mounted eccentrically. According to a second variant, the link chain drive is characterized in that the axle of one of the two wheels is mounted so as to be movable and is connected to a diverting mechanism. The eccentric mounting of the wheel causes a periodic change in length of the load-bearing strand, and as a result a non-uniform rotational speed of the drive chain sprocket, which reduces the polygon effect if the relationships are configured such that a rotation of the eccentric wheel rotates the drive chain sprocket precisely one tooth further.

I.3. According to a third embodiment of the underlying link chain drive having a drive chain sprocket for a link chain and having a drive system of non-uniform rotational speed, the drive system comprises the following elements:

- a motor, in particular an electric motor (geared motor), the rotor (component which is set in rotation) of which is coupled to the drive chain sprocket and the stator (component which does not rotate) of which is movable;
- a mechanism for moving the stator synchronously with the rotation of the drive chain sprocket.

Here, the stated mechanism preferably comprises a cam element which is coupled to and interacts with the drive chain sprocket and which is followed by a follower element, wherein the relative movement generated between the cam element and the follower element is transmitted to the stator of the motor.

II.1. According to a second aspect, the invention relates to a link chain drive which may be in particular an intermediate drive for an extended link chain, comprising a drive wheel with a shaft and with radially projecting teeth which engage in a force-transmitting manner into the link chain, and comprising a drive system which is coupled to the shaft in order to be able to actively set the drive wheel in rotation. The link chain drive is characterized in that the shaft—and therefore also the drive wheel—is mounted such that it can be displaced spatially in parallel. Here, the translation of the shaft preferably takes place only radially (without an axial component) with respect to its original position.

III.1. According to a third aspect, the invention relates to a link chain guide comprising a diverting wheel around which a link chain is guided. In the present case, "diverting wheel" is intended to denote both an actively driven wheel ("drive wheel") and also a non-driven wheel. Furthermore, the link chain guide comprises a support element which makes contact with the chain links of the link chain directly before they arrive at the diverting wheel. The link chain guide is characterized in that the support element is movably mounted in such a way that it can be moved synchronously with the rotation of the diverting wheel, in order to reduce the speed difference between the chain links and the diverting wheel at the time at which the chain links arrive at the diverting wheel.

III.2 According to the third aspect, the invention furthermore relates to a link chain guide having a diverting wheel around which a link chain is guided, and having a support element which makes contact with the chain links before they arrive at the diverting wheel, wherein the link chain has a bent profile between its primary running direction and the diverting wheel. The link chain guide is characterized in that the support element is arranged in the region of the bent profile of the link chain and is designed such that the movement of the chain links is adapted, before they arrive at the diverting wheel, to the movement of the associated tooth spaces.

IV.1. According to a fourth aspect, the invention relates to a link chain guide having a diverting wheel around which a link chain is guided. The link chain guide is characterized in that the diverting wheel is coupled to inertia compensation means, by which forces synchronous with the rotational movement of the diverting wheel are exerted on the diverting wheel such that speed fluctuations of the link chain owing to inertial influences of the diverting wheel are reduced.

In accordance with an added feature of the invention, it is provided that the first chain wheel and the second chain wheel are operated in a manner offset with respect to each other in such a way that, with a minimal effective lever arm at the first chain wheel in the same strand, the effective lever arm on the second chain wheel is not minimal, preferably deviates by ±20% or less of the difference between the maximum and minimum values from the maximum value, and is maximal, in particular. For this purpose, for example, the angular position of the first chain wheel can differ from that of the second chain wheel by at least ±30%, preferably by at least ±40% of the angular pitch, in particular by half of the angular pitch. This opposition in phase of the two chain wheels results in a reciprocating movement of the second chain wheel, configured as an idler wheel, for example, being reduced.

In accordance with another feature of the invention, it is provided that the escalator has at least one guide, which can influence the entry angle of the chain on the first and/or the second chain wheel, wherein the at least one guide is arranged in such a way that the entry angle with the minimum effective lever arm is smaller than with the maximum effective lever arm. Such an arrangement of the guide has the result that the oscillating movement of the redirecting station approaches zero when the machine is running, which has a positive effect on running smoothness. Moreover, this arrangement of the at least one guide has the effect that the wheels are only minimally loaded. This means that it is possible to use relatively cheap wheels.

Other features which are considered as characteristic for the invention are set forth in the appended claims.

Although the invention is illustrated and described herein as embodied in an escalator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 1:
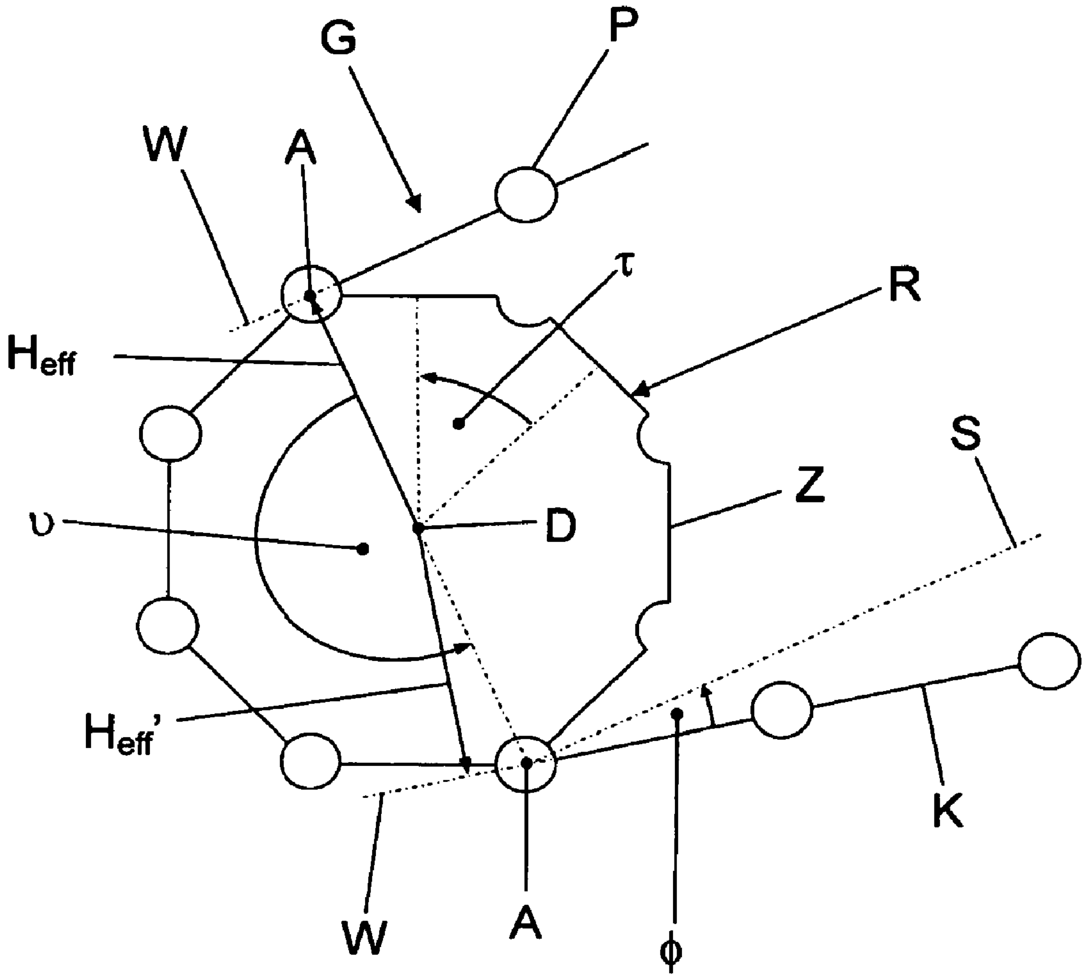
FIG. 1 is a diagram of a chain wheel and a pintle chain to illustrate the terms used.
Figure 2:
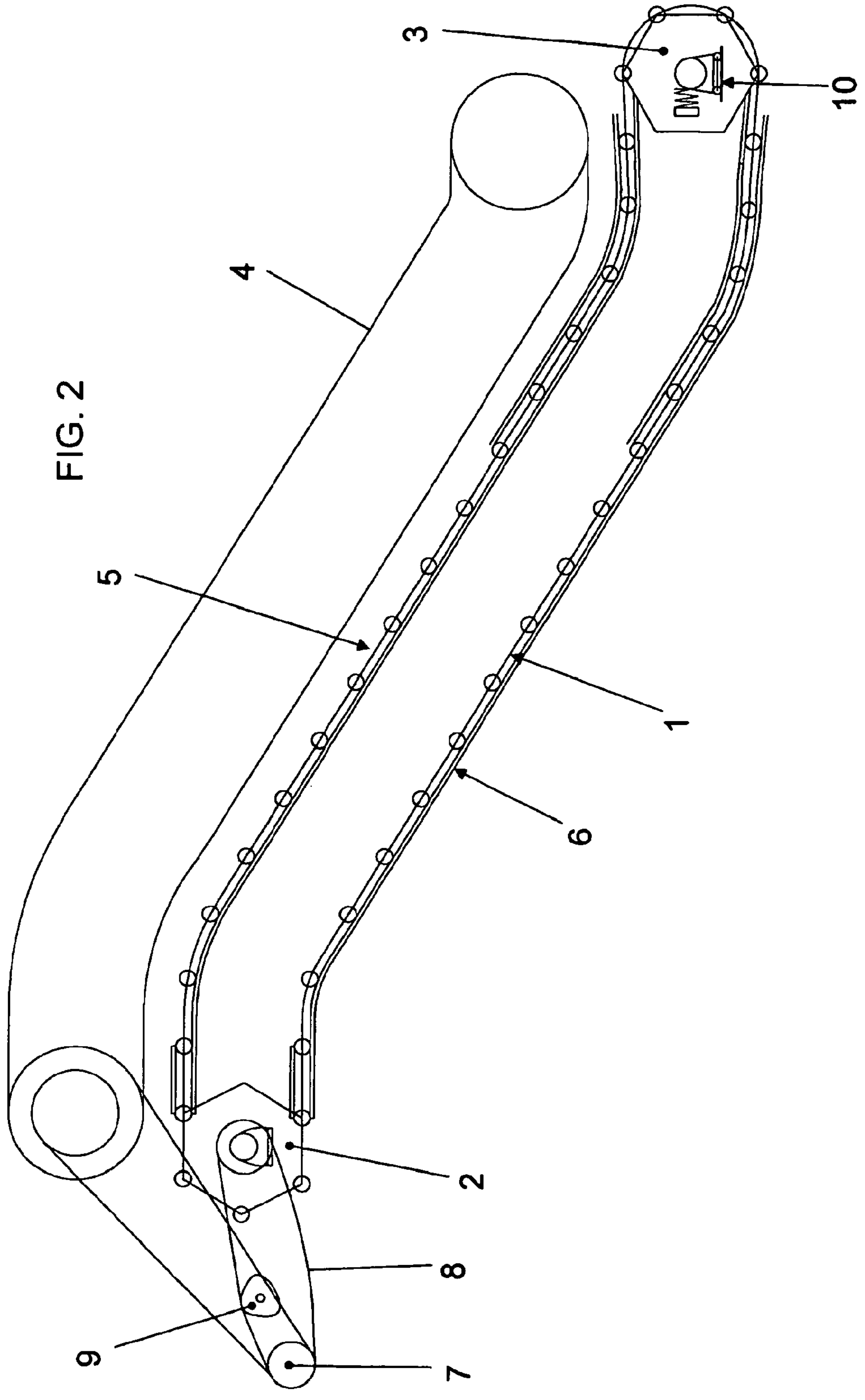
FIG. 2 is a diagrammatic side view of an escalator according to the present invention with an idler chain wheel.

The escalator as shown in FIG. 2 comprises a chain 1 configured as a pintle chain, wrapped around a first, driven chain wheel 2 and a second chain wheel 3 acting as an idler wheel. Each of the chain wheels 2, 3 has six teeth, only diagrammatically indicated. The steps or pallets (not shown) of the escalator are attached to the chain 1. A circulating hand rail 4 is only schematically shown in FIGS. 2 and 3, which can be held by a user during the movement of the escalator. Between the chain wheels 2, 3, the chain 1 forms an upper strand 5, shown at the top in each of FIGS. 2 to 4, and a lower strand 6, shown at the bottom in each of FIGS. 2 to 4.

The first chain wheel 2 is driven in a manner free of the polygonal effect, or polygonally compensated, by a drive motor 7 via a drive chain 8. This can be achieved, for example, in the exemplary embodiment shown, by a non-circular wheel 9 engaging the drive chain 8. Further possibilities of a polygonally-compensated drive are known from the WO 03/036129 A1, which is explicitly incorporated herein by reference. The polygonally-compensated drive allows the first chain wheel 2 to be driven with a non-constant angular velocity in such a way that the driven chain 1 is running at a constant, or near-constant, velocity.

The hand rail 4 is driven by the drive motor 7, wherein the hand rail 4 is driven at a constant angular velocity. The second chain wheel 3 is supported by means of a moveable support 10 in a displaceable manner.

Figure 4:
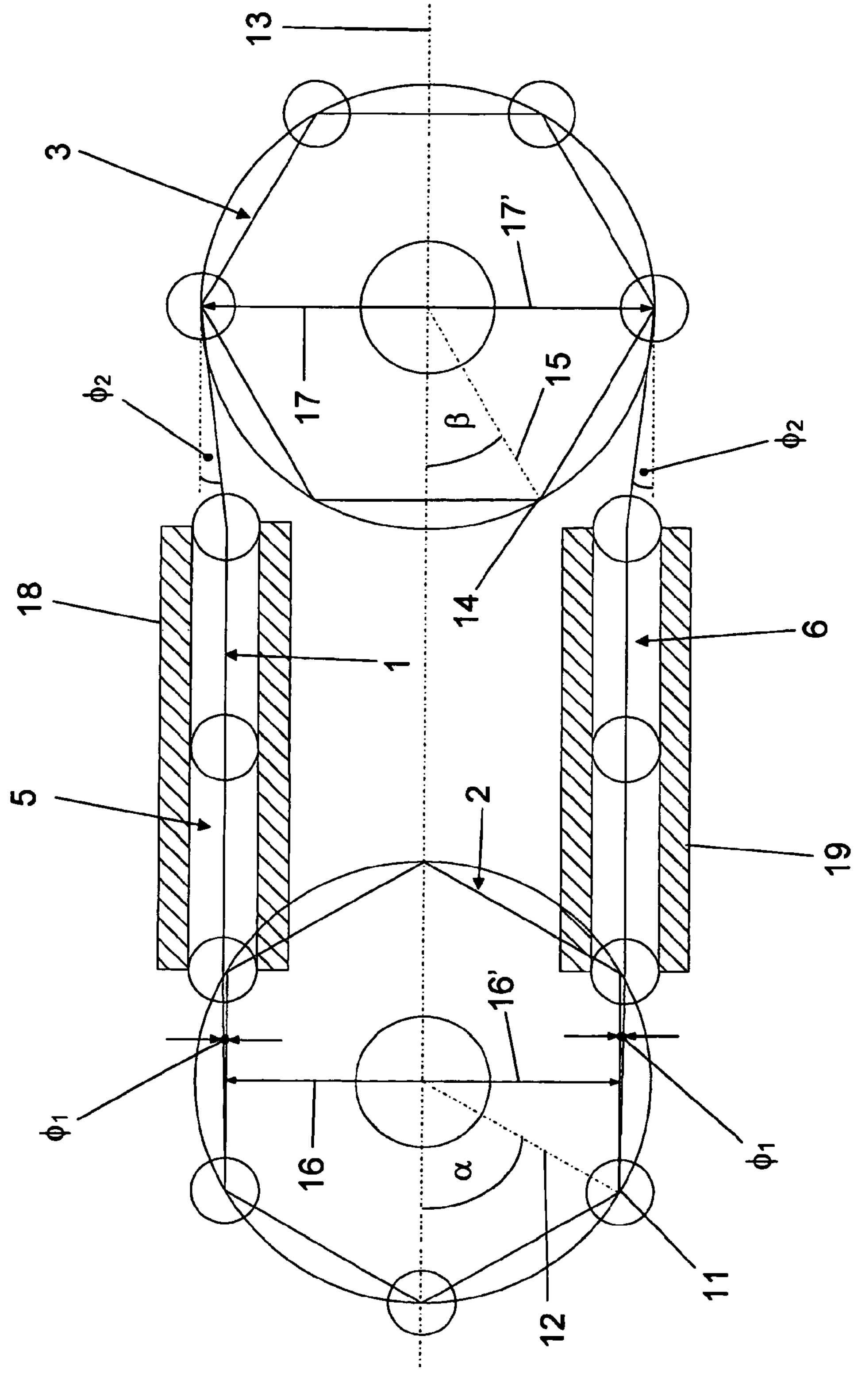
FIG. 4 is a diagrammatic enlarged view of several components essential for the function of the escalator according to FIG. 2.

In the view according to FIG. 4, the chain 1 is shown shortened. FIG. 4 shows that the second chain wheel 3 is offset from the first chain wheel 2 with respect to its angular position. For example, a radial line 12 extending through one of the contact points 11 of the chain 1 forms an angle $\alpha$ with the horizontal 13 on the first chain wheel 2 in FIG. 4, which is about 60°. In contrast, a radial line 15 extending through the corresponding contact point 14 of the chain 1 forms an angle $\beta$ with the horizontal 13 on the second chain wheel 3 in FIG. 4, which is about 30°. The angular positions of the chain wheels 2, 3 therefore differ by 30°, which corresponds to half the angular pitch of the chain wheels 2, 3 each having six teeth, because the angular pitch is 360° divided by the number of teeth.

This difference in the angular positions of chain wheels 2, 3 has the result that precisely at the point, where the chain 1 applies a minimum effective lever arm 16, 16' on the first chain wheel 2, the chain 1 applies a maximum effective lever arm 17, 17' on the second chain wheel 3 (see FIG. 4). In the reverse case, the chain 1 applies a maximum effective lever arm to the first chain wheel 2 whenever the chain 1 applies a minimum effective lever arm on the second chain wheel 3 (not shown).

Further, it can be seen from FIG. 4 that the effective lever arm 16 in the upper strand 5 on the first chain wheel 2 is equal to the effective lever arm 16' in the lower strand 6. Further, it can be seen from FIG. 4 that the effective lever arm 17 in the upper strand 5 is also equal to the effective lever arm 17' in the lower strand 6 on the second chain wheel 3.

Guides 18, 19 as seen from FIG. 4 can define the entry angles $\phi_1$, $\phi_2$ of the chain 1 on the chain wheels. Herein, in particular, the guide 18 is arranged toward the bottom in FIG. 4 to such an extent, or the guide 19 is arranged toward the top in FIG. 4 to such an extent that the entry angle $\phi_1$ with minimum effective lever arm 16, 16' (c.f. first chain wheel 2 in FIG. 4) is substantially smaller than the entry angle $\phi_2$ with maximum effective lever arm 17, 17' (c.f. second chain wheel 3 in FIG. 4).

Figure 3:
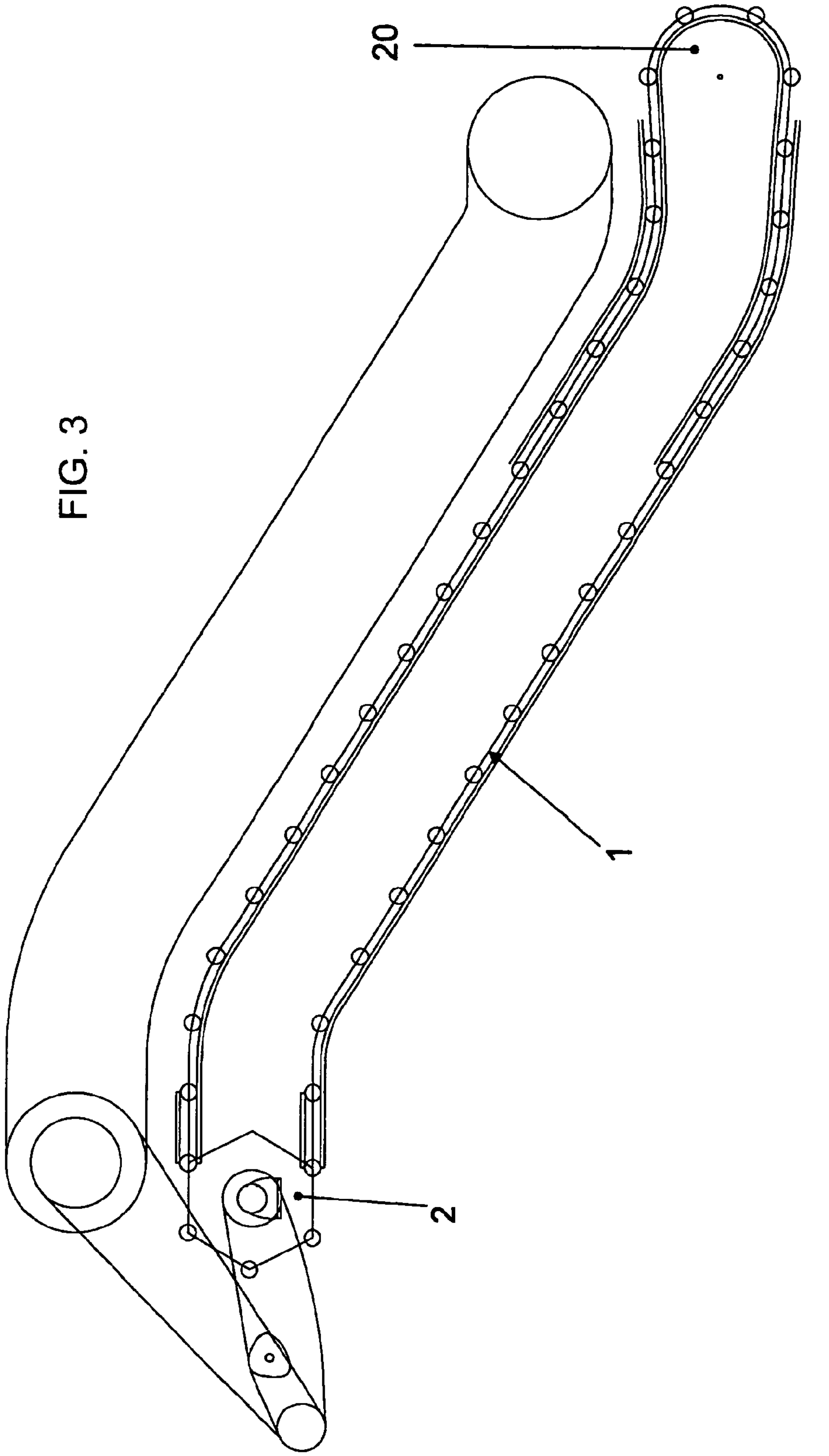
FIG. 3 is a diagrammatic side view of an escalator according to the present invention with a redirecting arc instead of an idler chain wheel.

In the embodiment according to FIG. 3, a redirecting arc 20 is provided instead of the second chain wheel 3. The radius for this redirecting arc 20 is chosen such that the effective lever arm (not shown) in the upper strand 5 is equal to the effective lever arm in the lower strand 6 also on the redirecting arc 20.

Furthermore, in the embodiment according to FIG. 3, the guides 18, 19 are also able to guide the chain 1 into the redirecting arc in such a way that the entry angle with minimum effective lever arm is substantially smaller than the entry angle with maximum effective lever arm. Furthermore, the redirecting arc 20, the first chain wheel 2 and the chain 1 can be configured and arranged in such a way that whenever the chain 1 applies a minimum effective lever arm 16, 16' to the first chain wheel 2, the chain 1 applies a maximum effective lever arm to the redirecting arc 20, and vice-versa.

A further partially functional description of the exemplary embodiments can be derived from the following.

The chain wheels 2, 3 used have an even number of teeth. This applies in the case that the angle of wrap of the chain 1 is about 180°, which is the normal case for escalators/moving sidewalks. What is crucial is that the effective lever arm on the side of the upper strand is always essentially identical to the effective lever arm on the side of the lower strand. This has the effect, in a polygonal compensation configured for the upper strand, that not only the upper strand runs at a constant velocity, but also the lower strand (in the case of an odd number of teeth and with a angle of wrap of 180° the lower strand would run with about double the irregularity as a conventional, i.e. not polygonally-compensated drive).

The angle of wrap can also deviate from 180° under the condition that the effective lever arms are identical for the upper and lower strands. This means that the number of teeth and the angle of wrap must be adapted for this case. When this condition is fulfilled, uniform chain velocities will result in the upper and the lower strand, which are requisite for smooth running of the escalator/the moving sidewalk.

The same rule also applies to the non-driven redirecting or idler station (with escalators it is usually the lower landing station) as to the driven chain wheel 2. Again, it is crucial to provide for identical effective lever arms. This also applies in the case where a chain wheel 3 is not used for redirecting, but a non-toothed, stationary-mounted or spring-loaded/elastically-mounted redirecting arc 20 is used. This means that the radii or diameters of the redirecting arc must be configured in such a way while also taking the diameter of the chain wheels into account, that the link center points of the chain 1 run on a corresponding pitch circle corresponding to that of a chain wheel having the corresponding number of teeth.

Since the chain wheels 2, 3 do not run at a constant angular velocity and this effect becomes greater the smaller the number of teeth, care must be taken that they are configured to be as light as possible, i.e. having only a small moment of inertia, so that the disturbing forces exerted by them on the chains/steps/pallets, are as small as possible. In particular, weight optimization must be observed for the points further removed from the pivot point, and weight reduction recesses or the like must be provided, if necessary.

Due to the polygonal contact of chain 1, in particular with large links, on the chain wheels 2, 3, usually the axle distance between the chain wheels 2, 3 changes from tooth engagement to tooth engagement. The chain 1 always has a constant length, apart from elastic expansion. The drive chain wheels are usually mounted in a stationary manner, and the idler chain wheels are resilient and linearly moveable on the fixture 10. The idler chain wheels therefore make a linear movement from pitch to pitch. This is the larger the greater the chain pitch and the smaller the number of teeth on the chain wheel.

In conventional escalators having a relatively small chain pitch and a relatively large number of teeth, as the case may be, this problem does not need to be addressed.

Since the pitch may be very large in an escalator (or moving sidewalk) according to the present invention, namely 1/1 or 1/2 of the step/pallet pitch, and the number of teeth may be very small, namely up to 6 or 4, the linear movement of the second chain wheel 3 acting as the idler wheel or the redirecting arc 20 can be so large that it will develop into a component disruptive for the smooth running of the escalator/the moving sidewalk. Disturbing mass forces result from this large linear movement of the redirecting station, and disturbing noises may also arise. The constellation is particularly disadvantageous if the drive and idler chain wheels have the same angular position (measured, for example, by angle $\alpha$ or $\beta$ of a chain wheel corner relative to the horizontal).

This is why the relative angular position $\alpha$, $\beta$ of the chain wheels 2, 3 must be observed, i.e., it should be opposed in phase: about half of a pitch angle (±20%) must be between the angular position of the first chain wheel 2 and that of the second chain wheel 3 (pitch angle=360° divided by the number of teeth). This means that the axle distance, the lifting height and the length of the chains must be adapted to each other.

Further, the first and second chain wheels 2, 3 should have the same number of teeth, if possible. Deviations from the same number of teeth within a range of ±30% are tolerable.

Furthermore, guiding of the chains is important. The guides 18, 19 used in an exemplary embodiment of the escalator according to the present invention have the effect that the chain 1 runs onto the chain wheels 2, 3 a little above the minimum effective lever arm. Furthermore, they are optionally curved at their ends, which has the effect that a velocity component in a radial direction is applied to the chain 1 shortly before contacting the chain wheels 2, 3, or after running off the chain wheels 2, 3. The impact component of the chain link points into the tooth spaces of the chain wheels, or onto the guides 18, 19 is therefore substantially reduced, which leads to considerably lower noise and more advantageous running properties.

Chain guides which cause the chains to run tangentially onto the chain wheels and therefore reduce entry noise (chain on chain wheel) cannot be used in an escalator according to the present invention, because due to the low number of teeth of the chain wheels and the resulting ratios of angles the stresses for the wheels become too great, or the wheels would have to be dimensioned for these stresses, which would make them very expensive. Moreover, a large oscillating movement of the redirecting station would result from this arrangement of the guides, which would lead to the above mentioned drawbacks.

In an escalator according to the present invention, the correct height of the guides 18, 19 between the minimum and maximum effective lever arm is near the minimum lever arm. If they are set at the correct height, the result is that the oscillating movement of the redirecting station approaches zero when the machine is running, which greatly improves smooth running. Moreover, the wheels are only slightly stressed with this arrangement of the guides. This means that relatively cheap wheels can be used.

The optimum height of the chain guides is determined as follows: The chain links are pivoted about a predetermined angle, when they leave the guides 18, 19. It is possible to draw or conceive small rectangular triangles there, the hypotenuse of which is the chain link in question, wherein one of the small sides is formed by the horizontal. All quantities may also be calculated with the aid of the angular functions. The sum of the horizontal small sides is now formed and various angular positions of the chain wheels are determined within a pitch angle. It is now imagined that the chains continue running another little bit and the chain wheels rotate further until they have rotated about a pitch angle. A pitch angle of about 60°, for example, is thus subdivided into 20 steps of 3° each, for example. The height of the guides is now changed until the sum of the horizontal small sides results in a value which is as constant as possible over the various angular positions. Where these deviations have reached their minimum, the linear movement of the idler chain wheels/the redirecting station is also at its minimum.

In real escalators, polygonal effects would also have to be taken into account, if any, which result in the transitions from horizontal to inclined portions (redirecting radii) when the chains run through the chain guides.

The invention claimed is:

1. An escalator, comprising:
- a plurality of steps or pallets;
- at least one chain for driving the steps or pallets;
- at least a first chain wheel around which said chain is partially wrapped, wherein said chain forms an upper strand and a lower strand extending from said first chain wheel;
- a second chain wheel around which said chain is partially wrapped;
- a number of teeth of said first chain wheel corresponding to a number of teeth of said second chain wheel; and
- wherein said first chain wheel and said second chain wheel are operated with an offset from each other so that with a minimum effective lever arm in a given strand at said first chain wheel, an effective lever arm in said given strand at said second chain wheel is not at a minimum.

2. The escalator according to claim 1, wherein the effective lever arm in said given strand at said second chain wheel deviates by no more than ±20% of a difference between a maximum value and a minimum value from the maximum value.

3. The escalator according to claim 1, wherein the effective lever arm in said given strand at said second chain wheel is maximal.

4. The escalator according to claim 1, which further comprises at least one guide configured to influence an entry angle of said chain onto said at least one chain wheel, wherein said at least one guide is disposed to set an entry angle smaller with a minimum effective lever arm than with a maximum effective lever arm.

5. The escalator according to claim 4, wherein said at least one guide includes a first guide disposed at a first said chain wheel and a second guide disposed at a second said chain wheel.

6. The escalator according to claim 1, wherein said first chain wheel is a driven chain wheel.

7. The escalator according to claim 1, wherein said second chain wheel is an idler wheel.

8. The escalator according to claim 1, wherein said first and second chain wheel each has an even number of teeth.

9. The escalator according to claim 1, wherein the number of teeth of said first and second chain wheels is equal to or smaller than 12.

10. The escalator according to claim 9, wherein the number of teeth of said first and second chain wheels is 4.

11. The escalator according to claim 9, wherein the number of teeth of said first and second chain wheels wheel is 6.

12. The escalator according to claim 1, wherein an average angle of wrap of at least one of said first and said second chain wheel deviates from an integer multiple of the pitch angle by a maximum of ±20% of the pitch angle.

13. The escalator according to claim 12, wherein the average angle of wrap of at least one of said first and said second chain wheel is an integer multiple of the pitch angle.

14. The escalator according to claim 1, wherein an angular phase position of said first chain wheel differs from an angular phase position of said second chain wheel by at least ±30% of a pitch angle.

15. The escalator according to claim 14, wherein the angular phase position of said first chain wheel differs from the angular phase position of said second chain wheel by at least ±40% of the pitch angle.

16. The escalator according to claim 15, wherein the angular phase position of said first chain wheel differs from the angular phase position of said second chain wheel by one half of the pitch angle.

17. The escalator according to claim 1, which comprises a redirecting arc instead of a chain wheel configured as an idler wheel.

18. The escalator according to claim 17, wherein an angle of wrap of said redirecting arc deviates from an integer multiple of a pitch angle by a maximum of ±20% of the pitch angle.

19. The escalator according to claim 17, wherein an average angle of wrap of said redirecting arc is an integer multiple of a pitch angle.

20. The escalator according to claim 1, wherein said given strand at said first chain wheel is the same strand as said given strand at said second chain wheel.

* * * * *